Oct. 16, 1956     J. B. PLATNER ET AL     2,766,743
HIGH OUTPUT ENGINE Filed July 5, 1952     6 Sheets-Sheet 1

INVENTORS.
John B. Platner.
Charles D. Moore.
BY
Harness & Harris
ATTORNEYS.

Oct. 16, 1956   J. B. PLATNER ET AL   2,766,743
HIGH OUTPUT ENGINE
Filed July 5, 1952   6 Sheets-Sheet 3

INVENTORS.
John B. Platner.
Charles D. Moore.
BY
Harness & Harris
ATTORNEYS

INVENTORS.
John B. Platner
Charles D. Moore
BY
Harness & Harris
ATTORNEYS

INVENTORS.
John B. Platner
Charles D. Moore.
BY
Harness & Harris
ATTORNEYS.

United States Patent Office 2,766,743
Patented Oct. 16, 1956

2,766,743

HIGH OUTPUT ENGINE

John B. Platner, Detroit, and Charles D. Moore, Birmingham, Mich., assignors to Chrysler Corporation, Highland Park, Mich., a corporation of Delaware Application July 5, 1952, Serial No. 297,318

22 Claims. (Cl. 123—55)

This invention relates to engines operable to provide high power outputs and particularly to air-fuel mixture feeding and distributing systems for engines having two opposed banks of cylinders, as in V engines, facilitating the obtaining of high power outputs.

In our experimentation to obtain increased power outputs with engines of the foregoing type, we have tried various intake manifolding structures, among them runner type intake manifolds. Although it is well known that runner type manifolds have in the usual instance, rather unsatisfactory air-fuel mixture distribution characteristics which would normally obviate their use for high power output work, we have discovered that in spite of these characteristics the influence of runner type manifolding on power output is generally beneficial. Moreover, we have found that the mixture distribution characteristics of runner type manifolding can be improved to enhance the power output.

It is, therefore, the general object of our invention to materially increase the power output of V-type engines by providing an air-fuel feeding and distribution system (utilizing runner type manifolding) which will not only enable the beneficial effects of high power output to be secured, but which will enhance this benefit by providing an improved air-fuel mixture distribution system.

We have further discovered that the high power output benefits may be materially enhanced by the use of runner type manifolding selected to produce a favorable dynamic charging effect upon the cylinders of the engine.

Hence, it is a further object of this invention to provide an air-fuel feeding and distribution system wherein a substantial dynamic charging or ram effect is obtained upon the cylinders of the engine and particularly through the medium and high speed ranges of the engine.

We have found that the foregoing features and desired high power outputs are obtainable, for example, in V engines by utilizing for the air-fuel mixture feed a plurality of carburetors, for instance in an 8-cylinder V engine, four single carburetors, two dual carburetors, or preferably, two four-barrel staged carburetors and coupling these with a simple runner or header type intake manifold, the runner passages of which are connected with the carburetors or barrels thereof by very low risers and with the cylinder head intake ports by short direct ducts and which runner passages are interconnected by what we term "balancing means" which may be in the form, for example, of one or more unrestricted passages directly interconnecting the runner passages of the manifold.

By preference, the individual barrels of the fuel supply means will be arranged to discharge their air-fuel mixtures to the runner passages at positions operably intermediate alternate pairs of cylinders in a bank, such as between each pair of end cylinders in a V-8 engine and the balancing means will be arranged to interconnect the runner passages at positions intermediate adjacent pairs of cylinders.

The stated structure and arrangement brings each cylinder of the engine into intimate relationship with at least one carburetor or barrel thereof, maintains optimum passage lengths from carburetor air horn air entrance to intake valves, and enables each carburetor or barrel thereof to supply the primary fuel demands of the nearest pair of cylinders or either of them. Moreover, the balancing means makes it possible for the cylinders to draw their intake charges from any and all barrels of the fuel supply means should the need arise thus insuring an ample quantity of the air-fuel mixture for each cylinder under all operating conditions as well as a mixture of substantially uniform quality. Furthermore, the balancing means makes possible substantially uniform manifold vacuum, improvements of air-fuel mixture distribution of the runner manifolding to the cylinders and markedly influences the dynamic charging of the cylinders in the medium and upper speed ranges of the engine.

In our experimentation we have also discovered that certain balancing structures when used in the aforesaid arrangements are capable of facilitating more uniform air-fuel mixture distribution and better dynamic or ram effects on the cylinders than others thus contributing to greater power outputs. For example, where the balancing means provided in an 8-cylinder V engine utilizing a runner type manifold comprises a pair of independent crossover tubes connecting the opposite runners at points intermediate each pair of end cylinders, the engine is capable of good power outputs but it is possible for the engine during the suction cycle to tend to draw more of the wet fuel towards the ends of the runners to add to the enrichment of the end cylinders at the expense of the middle cylinders.

Where, on the other hand, as in our preferred embodiment, the balancing means for a V-8 engine comprises a single crossover tube or passage between the opposite runners and preferably at a position intermediate the inner cylinders of each bank, the engine during the operating cycle draws towards the two center cylinders of each bank some of the wet fuel which otherwise tends to over-enrich the end cylinders. Consequently, over-enrichment of the end cylinders is thereby inhibited and a better overall balance of air-fuel mixture distribution between the cylinders is obtained, this contributing to still higher engine power outputs.

The use of a single crossover balancing tube moreover facilitates greater dynamic charging or so-called ram of the cylinders which is characterized by the pushing of the air-fuel mixture into the cylinders as opposed to sucking it in. This greater dynamic effect contributes to higher power outputs in the operation of the engine in its mid and high speed ranges and simultaneously provides an improvement of the torque output of the engine in these ranges. It may be stated in passing that since the mid and high speed ranges of operation vary with the particular engines, it is difficult to state any given range of speeds. However, for the purpose of this invention we mean by high speed range, that speed range near which the engine produces its greatest power. For example, the average top speed for peak power for passenger car engines is generally between 3800 and 4000 R. P. M., whereas for sport cars utilizing the manifolding disclosed herein, the average top speed for peak power is between 5000 and 5600 R. P. M.

Accordingly, it is a specific object of our invention to provide in a V type engine a runner type manifolding including a balancing structure consisting of a single crossover tube or passage of unrestricted character interconnecting the runner passages of the manifold.

We have also found that a larger ultimate power output in the peak power range of the engine is made possible in the foregoing arrangements where in an 8-cylinder V engine, two four-barrel carburetors are employed in place of, for example, four single carburetors.

It appears that a fuel distribution system using these feeding devices provides a denser air-fuel medium or lower manifold vacuum by enabling the freeing of carburetor restrictions otherwise encountered where single barrel carburetors are employed.

Furthermore, we have discovered that where the barrels of the four-barrel carburetor are grouped in two pairs, one pair a primary pair having its throttle valves operated by a common control shaft and the other pair, a secondary pair, having its throttle valves operated by a different common control shaft, that if one barrel of each pair is arranged to deliver its primary air-fuel mixture charge to one and the same runner passage, and the remaining two barrels of the pairs arranged to deliver their air-fuel mixture charges to the other runner passage, it is possible by control of the throttle valves to stage the pairs of barrels to have the primary barrels initially deliver their charges to the respective runner passages they feed and thereafter when maximum output is desired, to have the secondary barrels deliver their charges to the respective runner passages they feed. In this manner it is possible to obtain better control of fuel metering facilitating the withholding of the full charge delivery of the carburetor until it is required for maximum power output and to obtain an improvement in resultant road flexibility.

It is, therefore, another object of our invention to provide an air-fuel feeding and distribution system employing a double runner type manifold provided with balancing means, which manifold is fed by two four-barrel carburetors, and wherein the four barrels are paired and staged such that each runner receives its primary charge of air-fuel mixture from only one barrel of each pair and the air-fuel charges of the primary and secondary stages are sequentially delivered.

It should be noted that to secure high power outputs in a V engine, a proper selection of valve timing is desirable to aid in the full utilization of the manifold characteristics, and in this connection we preferably utilize a valve timing that will close the inlet valve considerably after the piston has passed bottom dead center, for instance 70° after bottom dead center.

Other objects and advantages of our invention will appear from the following description and from the drawings wherein.

Figure 1:
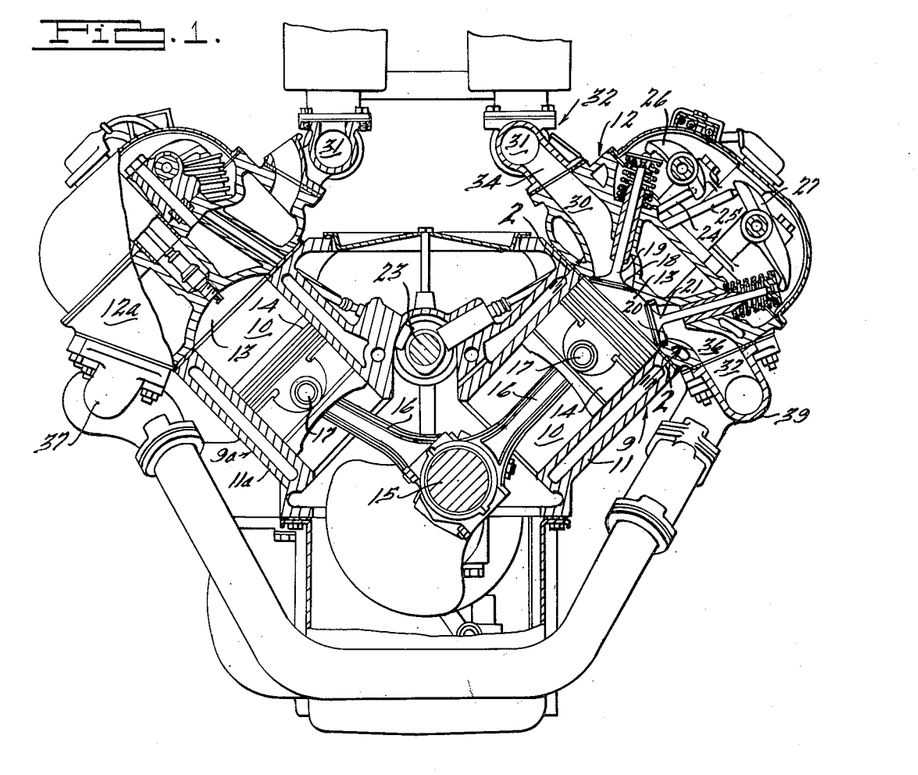
Figure 1 is an end elevation partly in section of a V-8 engine of current manufacture to which our invention has been applied and which is shown as viewed from the front or fan end of the engine.
Figure 2:
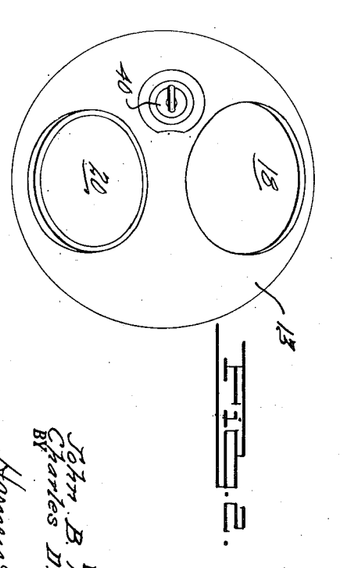
Figure 2 is a plan view looking upwardly into the hemispherical combustion chamber of one cylinder of the engine of Figure 1 and showing the relative location of the intake and exhaust valves to each other and the sparking means.

Referring now to the drawings wherein similar numerals are used to designate similar parts in the structure, we have illustrated our invention as applied, for example, to 8-cylinder V engines, Figure 1 showing a cross section of such an engine of current manufacture having a 3.812" diameter bore, a 3.625" piston stroke, and a 331 cu. in. displacement. As seen, for example in Figures 1 and 10, this engine has two banks 9 and 9ᵃ of cylinders 10 arranged at 90° in cylinder blocks 11 and 11ᵃ to which cylinder heads 12 and 12ᵃ are secured and provided with hemispherical combustion chambers 13 immediately over each cylinder 10. The cylinders of each bank are aligned longitudinally of the engine, and the cylinders of the opposite banks are offset longitudinally relative to each other. For convenient reference, the cylinders of the left cylinder bank looking forwardly from the flywheel end of the engine are numbered 1, 3, 5, and 7 starting from the fan end, and those of the right bank are numbered 2, 4, 6, and 8 respectively, these numerals appearing internally of the cylinder representations in Figures 3, 4, 5, 10, 11, and 16.

Figure 8:
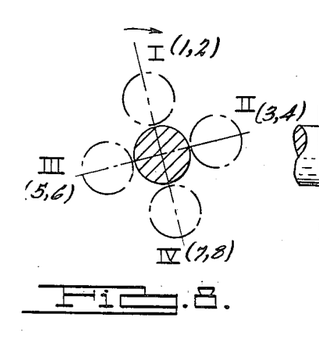
Figures 8 and 9, are respectively, end and side elevational views of the 90° crank of Figure 6.
Figure 9:
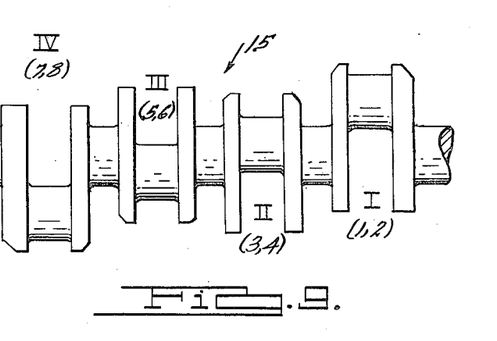

Each cylinder is provided with a piston 14 reciprocable therein and operably connected to a crankshaft 15 through a connecting rod 16 and wrist pin 17. Crankshaft 15 may be a 90° crankshaft as seen, for example, in Figures 6, 8, and 9 wherein the double crank throws I, II, III, and IV are arranged consecutively at 90° to each other, throw I connecting with the pistons of cylinders 1 and 2, throw II with the cylinders 3 and 4, throw III with the cylinders 5 and 6, and throw IV with the cylinders 7 and 8. Figure 7 schematically shows a similar crank to that of Figures 6 and 8 wherein the throws II and III have been interchanged such that the throw II is positioned 270° of crank rotation from the throw I counting in the direction of the arrow in Figures 6, 7, and 8, whereas the throw II in Figures 6 and 8 is only 90° of crank rotation from the throw I.

Figure 6:
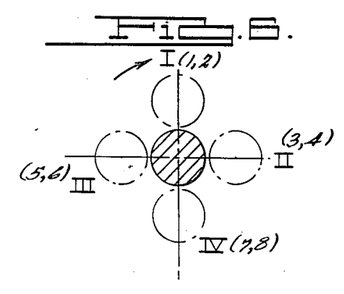
Figures 6 and 7 are schematic views of two suggested crank pin arrangements for an engine utilizing our invention, the Roman numerals in the figures indicating the positioning of the crank throws counting from the front or fan end of the engine, and the numerals in the brackets indicating cylinder numbers whose pistons are connected with the crank throws.
Figure 7:
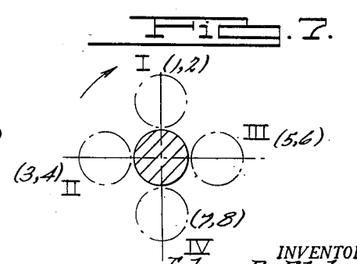

Various firing orders are possible for the crank arrangements of Figures 6 and 7, an example of that for the crank arrangement of Figure 6 being the firing order 1-8-4-3-6-5-7-2, and an example of the firing order for the crank arrangement of Figure 7 being 1-8-6-5-4-3-7-2, these firing orders providing alternate suctions between opposite banks of cylinders except for two cylinders of each bank which fire successively, to wit, the cylinders 8 and 4 and 5 and 7 of the Figure 6 arrangement, and cylinders 8 and 6 and 3 and 7 of the Figure 7 arrangement. It is preferred that the firing order selected for the engine utilizing our invention be one which will not successively fire all the cylinders of any one bank.

The hemispherical combustion chambers or cavities 13 of the cylinders 10 are by preference each provided with a single inlet opening 18 closed by an inlet valve 19 and a single exhaust outlet 20 closed by an exhaust valve 21, these valves being arranged transversely of the longitudinal axis 22 of the engine and at a substantial angle, for instance 60° to each other, and on a great arc of the spherical segment forming the combustion chamber 13.

The inlet and exhaust valves of both banks of the engine are operable from a single cam shaft 23 located above the crankshaft 15, the cam shaft actuating push rods 24 and 25 respectively of the inlet and exhaust valve mechanism which in turn actuate respectively the inlet valve rocker arm 26 and exhaust valve rocker arm 27, these rocker arms actuating in turn the normally spring-held-closed valves 19 and 21.

By preference, the cam shaft 23 is arranged to open the respective inlet valves 19 at 30° before top dead center position of the piston, and to close the exhaust valves at 30° after top dead center position of the piston so as to maintain the intake valves open during 280° of crank rotation and to maintain the exhaust valve open during 270° of crankshaft rotation with an overlap of 60° crankshaft rotation between opening of the inlet valve and closing of the exhaust valve of each cylinder.

The inlet valves 19 are for the purposes of the present invention, made as large as the hemispherical cavity of the combustion chamber and angularity of the valves will permit. As seen in Figure 1, the inlet opening 18 and the inlet valve 19 are located at the terminus of a relatively short streamlined inlet port 30 which connects with a runner passage 31 of the intake manifolding of our invention generally designated by the numeral 32 by way of a branch passage or duct 34, the passage 31 and duct 34 in Figure 1 being those, for example, of the manifold shown in Figure 10.

The exhaust valves 21 are associated with exhaust ports generally designated by the numeral 36 which connect with a side branch 37 of the exhaust manifold generally designated by the numeral 39 which conducts the exhaust gases away from the combustion chambers 13 during the exhaust stroke of the pistons.

Figure 3:
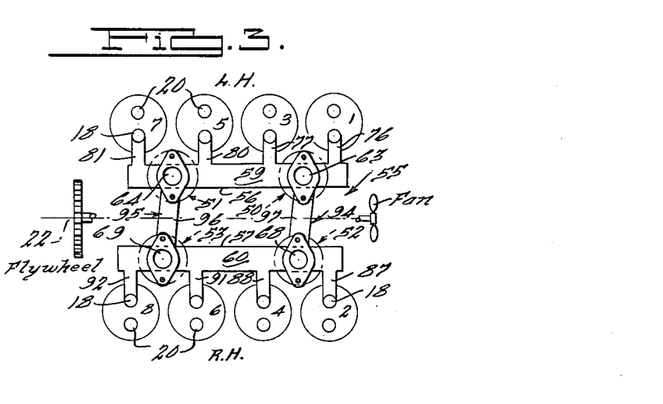
Figure 3 is a schematic view illustrating the runner type manifolding of our invention as applied to a V-8 engine and which utilizes four single downdraft carburetors and two balancing tubes.
Figure 4:
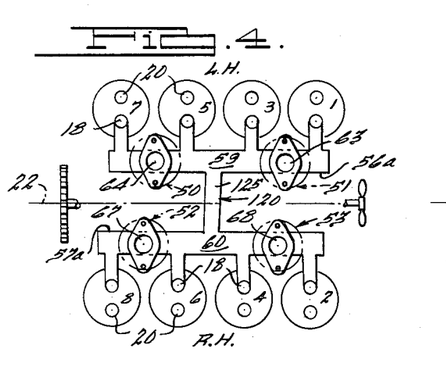
Figure 4 is a schematic view similar to that shown in Figure 3 illustrating the preferred form of manifolding of our invention utilizing a single balancing tube interconnecting the runners.
Figure 11:
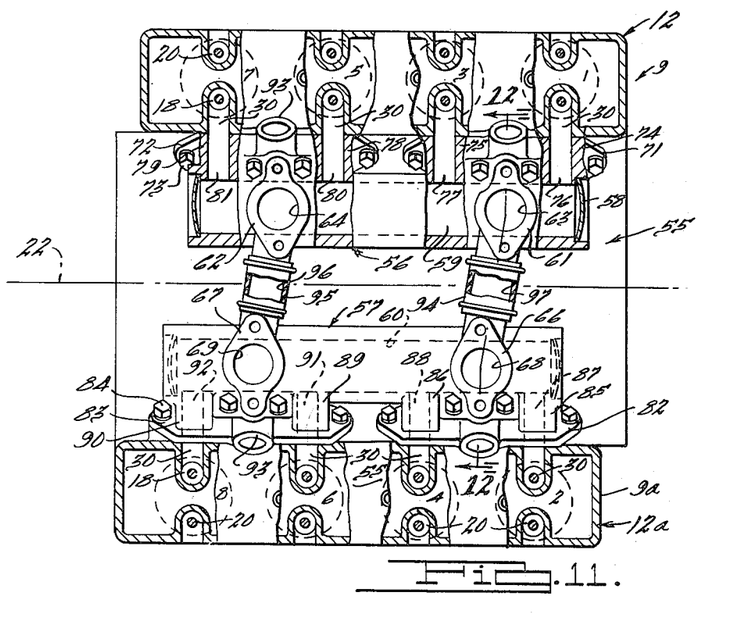
Figure 11 is a plan view partly in section showing the construction of the intake manifolding of Figure 3 in relation to the cylinder heads of the engine.
Figure 12:
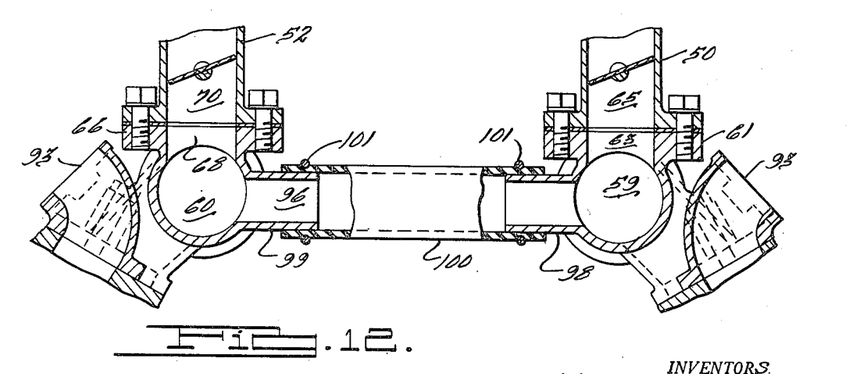
Figure 12 is a cross sectional elevation taken at 12—12 of Figure 11 through the balancing means connecting the opposite runners and showing the manner of mounting the air-fuel mixing means on the manifold runners.

Figures 3, 11, and 12 show one form of air-fuel distribution system utilizing the novel features of our invention and which provides for feeding the air-fuel mixture from four single fuel mixing means or carburetors 50, 51, 52, and 53 to an intake manifold structure generally designated by the numeral 55.

The intake manifold 55 comprises a pair of similar, generally cylindrical-shaped elongated runner conduits or headers 56 and 57 closed at the ends as by plugs 58 and extending longitudinally of the engine, generally paralleling the axis 22 of the engine and in juxtaposition respectively to the cylinder banks 9 and 9ª. These conduits 56 and 57 provide respectively the horizontal and longitudinally extending air-fuel mixture conducting runner or header passages 59 and 60.

Rising substantially vertically from the conduit 56 are short, flanged inlets or risers 61 and 62, one preferably located intermediate the pair of end cylinders 1 and 3, and the other between the pair of end cylinders 5 and 7. These inlets which respectively seat the fuel mixing means 50 and 51, provide short, vertical, primary air-fuel mixture inlet passages or risers 63 and 64 respectively, connecting the bores 65, respectively leading from the air horn (not shown) of the fuel mixing means 50 and 51, with the runner passage 59.

The conduit 57 has similar vertical flanged inlets or risers 66 and 67 respectively, seating the fuel mixing means 52 and 53 and which provide short, primary air-fuel mixture inlet passages or risers 68 and 69 between the throttle bores 70 respectively, of the fuel mixing means 52 and 53, and the runner passage 60.

The conduit or header 56 is secured to the cylinder head 12 of the cylinder bank 9 by integral spaced brackets 71 and 72 through bolts 73 (see Figure 11). The bracket 71 includes lateral cylindrical branch conduits 74 and 75 connecting with the runner conduit 56 and which extend downwardly and outwardly from the runner conduit 56 at an angle of approximately 45° with the vertical. The branches 74 and 75 provide short, lateral air-fuel mixture distributing branch passages 76 and 77 respectively, which open into and connect with the runner passage 59 at one end and at the other end with the intake ports 30 in the cylinder head 12 leading to the inlet valves 18 of the cylinders 1 and 3. Similarly, the bracket 72 includes cylindrical branch conduits 78 and 79 providing the short branch passages 80 and 81 connecting the runner passage 59 with the intake ports 30 of the cylinder head 12 leading to the intake valves 18 of the cylinders 5 and 7.

The runner conduit or header 57 is of similar construction to the runner 56, is similarly mounted to its cylinder head 12ª, and has similar branch conduits and passages. Thus the runner conduit 57 is secured to the cylinder head 12ª of the cylinder bank 9ª by spaced brackets 82 and 83 through bolts 84. The bracket 82 includes lateral branch conduits 85 and 86 which provide the branch passages 87 and 88 respectively, connecting the runner passage 60 with the intake ports 30 of the cylinder head 12ª leading to the intake valves 18 of the cylinders 2 and 4. Likewise the bracket 83 includes lateral branch conduits 89 and 90 extending outwardly of the conduit 57 and providing the branch passages 91 and 92 respectively, connecting the runner passage 60 with the intake ports 30 of the head 12ª leading to the intake valves 18 of the cylinders 6 and 8.

The brackets 71, 72, and 82, 83 seat on finished faces of the cylinder block portions 12 and 12ª which faces preferably form an included angle of approximately 120°. Moreover, these brackets each include an elbow-shaped conduit 93 which provide water connections to the cylinder heads forming no part of the subject invention.

It will be noted that the described runner passages and branch passages provide relatively short, direct paths of optimum length between the intake valves of each pair of end cylinders of the engine and the air horn of the nearest fuel mixing means located between them. In order to provide the distributing system with a dynamic effect conducive to maximum output (either power or torque), it is found that the passage length in inches from the air horn (i. e., air entrance of the air horn) of the fuel mixing means to the intake valve measured on the axis of the passages, ports, risers, etc. is preferably a distance represented by the emperical formula $$L = \frac{72C}{N}$$

where L is the stated length in inches; N is the engine speed (R. P. M.) at which the selected output is to peak and C is the velocity of sound in feet per second in the manifold passages under the specific temperature and pressure condition expected. In connection with the value of C it should be borne in mind that it is well known that engines of the type contemplated by the subject invention operate for a given fuel at a relatively constant maximum power fuel-air ratio.

In accordance with this formula, the distance from the air horn of the fuel mixing means to the intake valves in the structure of Figures 3 and 11 will preferably be approximately 18 inches.

A particular feature of our invention is the provision of balancing means between the passages 59 and 60 of the runners or headers 56 and 57. In the described embodiment of Figures 3, 11, and 12 such balancing means consists of two longitudinally spaced-apart transversely extending conduits generally designated by the numerals 94 and 95 located in the plane of the conduits 56 and 57 and connecting with them intermediate pairs of opposite end cylinders and preferably on a line connecting the axes of the opposite fuel mixing means.

The balancing conduits 94, 95 are preferably straight, continuous, tubular substantially parallel elements integrally connecting the conduits 56 and 57 and providing the unrestricted balancing passages 96 and 97 opening into the runner passages 59 and 60. By preference, the cross sectional area of the passages 96 and 97 will be of substantial size, for instance 1½ inches in diameter in an engine as disclosed, and preferably at least 50% of the cross sectional area of a runner passage. This is desirable in order to make the work of the balancing means in equalizing distribution and improving the dynamic conditions most effective. It will be understood that although the balancing conduits 94 and 95 have, as shown in Figure 12, been constructed to provide for disassembly thereof to facilitate the making of the runner conduits 56 and 57 as separable, identical members they may be made integral with the conduits 94 and 95.

In Figure 12 the balancing conduits comprise tubular lateral projections 98 and 99 respectively, on the conduits 56 and 57 respectively, opening into the passages 59 and 60 respectively, and which are connected by a sleeve 100 which may be of rubber or metal, suitably secured as by clamping means 101 to the projections 98 and 99. The projections 98 and 99 are preferably arranged at an angle of the axis of the conduits 59 and 60 by the extent of the offset relationship of the conduits to facilitate making the conduits 56 and 57 identical.

It will be noted that although each fuel mixing means may supply the primary fuel demands of the nearest pair of cylinders, the balancing means makes it possible for the cylinders where necessary to draw their intake charges from any and all of the mixing means, thus making possible the provision of an ample supply of air-fuel mixture for each cylinder under all operating conditions. The balancing means also improves the tuning of the intake system thus influencing the dynamic charging of the cylinders especially in the medium and upper speed ranges of the engine.

An engine constructed as above having an 8.1 compression ratio and employing two one-inch copper balancing pipes and 2" runners gave the following power and torque characteristics at the speeds indicated:

| R. P. M. | B. H. P. | Torque (lb. ft.) |
| --- | --- | --- |
| 2,000 | 113.9 | 299.1 |
| 3,600 | 231.5 | 338.0 |
| 4,000 | 254.7 | 334.3 |
| 4,400 | 276.5 | 330.1 |
| 5,200 | 306.3 | 309.3 | and gave the following mixture distribution and consumption characteristics:

| R. P. M. | B.S.F.C. (lb./ B.H.P. Hr.) | Mixture Distribution F/A Ratio By Cylinders | | | | | | | |
| --- | --- | --- | --- | --- | --- | --- | --- | --- | --- |
| | | 1 | 3 | 2 | 4 | 5 | 7 | 6 | 8 |
| 2,000 | .488 | .089 | .073 | .082 | .076 | .074 | .083 | .073 | .091 |
| 3,600 | .495 | .089 | .071 | .079 | .077 | .075 | .083 | .071 | .089 |
| 4,400 | .494 | .095 | .072 | .083 | .075 | .072 | .090 | .071 | .096 |

Figure 10:
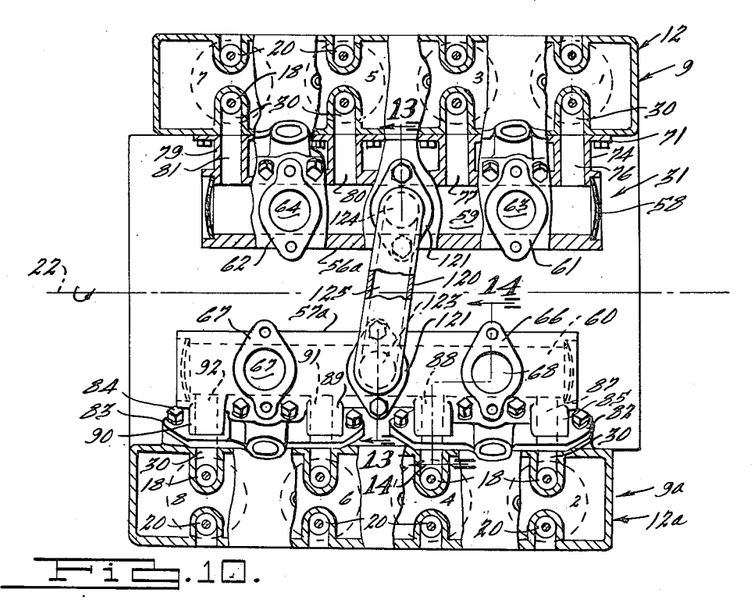
Figure 10 is a plan view partly in section showing the construction of the intake manifolding of Figure 4 in relation to the cylinder heads of the engine.
Figure 13:
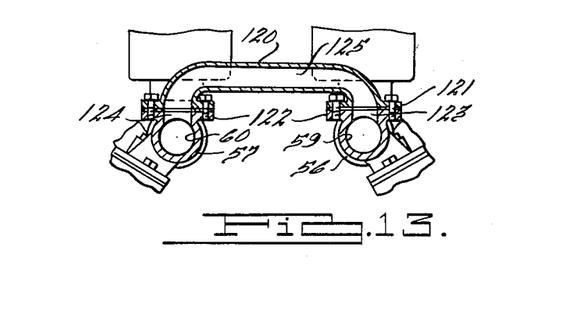
Figure 13 is a cross sectional elevational view taken at 13—13 of Figure 10, showing an overhead form of balancing means and showing a pair of the four downdraft carburetors of Figure 10 mounted on the runner members of the manifold.
Figure 14:
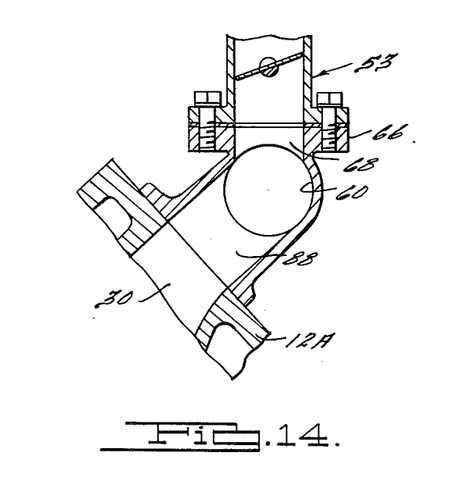
Figure 14 is a cross sectional elevation taken at 14—14 of Figure 10 showing the manner of securing the carburetors to the intake manifold of this figure.

In Figures 1, 4, 10, 13, and 14 we have illustrated a modified and preferred construction of the distribution system of our invention utilizing a plurality of individual fuel mixing means and a runner type manifold with balancing means. It differs from the Figure 11 construction primarily in that it provides a single balancing conduit 120 rather than the two such conduits provided in Figure 11. As seen in Figure 10, the conduit 120 is located substantially midway the longitudinal ends of the engine and preferably intermediate the opposite pairs of inner cylinders and may, as in Figure 12, be in the same horizontal plane as the conduits 56 and 57 here numbered 56ª and 57ᵇ. Preferably, however, the balancing conduit 120 will, as seen in Figure 13, comprise an overhead U-shaped tube substantially straight in the central portion and having smoothly curved downwardly projecting ends which terminate at each end in mounting flanges 121 for securement to similar mounting flanges provided by short vertical branches 122 of the runner conduits 56 and 57. The mounting branches 122 will preferably be in alignment with the fuel mounting risers 61, 62 and 65, 66 on the same runner conduit and will have short riser passages 123, 124 connecting the balancing passage 125 of the conduit 120 with the runner passages 59 and 60. In order to maintain the similarity of the construction of the conduits 56 and 57, the balancing conduit 120 may have its axis oblique to the longitudinal axis 122 of the engine by an amount determined by the offset of the cylinders of the opposite banks of the engine.

The single balancing means 120, as previously indicated, has the distinct advantage of inhibiting over-enrichment of the end cylinders thus creating a better overall balance of air-fuel mixture distribution between the cylinders than the construction in Figure 11 and making possible higher engine power outputs. Moreover, the single means, particularly when of the overhead type, effects a superior tuning of the distribution system thus facilitating a greater dynamic charging of the cylinders which not only contributes to the higher power outputs but also produces an improvement in the torque output in the mid and high speed ranges of the engine.

An engine construction as above having an 8.1 compression ratio and employing a single copper balancing pipe gave the following power and torque characteristics at the speeds indicated:

(a) PIPE IN PLANE OF RUNNER PASSAGES

| R. P. M. | B. H. P. | Torque (lb. ft.) |
| --- | --- | --- |
| 2,000 | 111.8 | 293.5 |
| 3,600 | 232.9 | 340.0 |
| 4,400 | 273.8 | 327.0 |
| 5,200 | 306.2 | 309.3 |

(b) OVERHEAD PIPE AS IN FIGURE 13

| 2,000 | 113.7 | 298.8 |
| 3,600 | 230.9 | 337.1 |
| 4,000 | 258.1 | 338.9 |
| 4,400 | 230.1 | 334.4 |
| 5,200 | 309.1 | 312.2 | and gave the following mixture distribution and fuel consumption characteristics:

(a) PIPE IN PLANE OF RUNNER PASSAGES

| R. P. M. | B.S.F.C. (lb./ B.H.P. Hr.) | Mixture Distribution F/A Ratio By Cylinders | | | | | | | |
| --- | --- | --- | --- | --- | --- | --- | --- | --- | --- |
| | | 1 | 3 | 2 | 4 | 5 | 7 | 6 | 8 |
| 2,000 | .457 | .081 | .076 | .085 | .073 | .071 | .083 | .078 | .030 |
| 3,600 | .472 | .035 | .077 | .083 | .077 | .075 | .030 | .073 | .076 |
| 4,400 | .469 | .030 | .076 | .079 | .073 | .074 | .075 | .032 | .079 |

(b) OVERHEAD PIPE AS IN FIGURE 13

| 2,000 | .463 | .032 | .076 | .085 | .073 | .073 | .085 | .077 | .079 |
| 3,600 | .472 | .073 | .078 | .033 | .076 | .075 | .036 | .077 | .081 |
| 4,400 | .472 | .076 | .078 | .032 | .076 | .077 | .083 | .076 | .081 |

Although the construction in Figure 10 has been illustrated as providing for the use of independent fuel mixing means, it will be understood that the carburetor pairs 50 and 52 and 51 and 53 (see Figure 4) may each be replaced by single dual carburetors, one barrel of each dual carburetor taking the place of one of the independent carburetors. In the latter connection, the dual carburetors would be preferably located on a line intermediate the pairs of end cylinders of the opposite banks with provision for one barrel of the carburetor to feed the passage 59 and the other to feed the passage 60. Moreover, the carburetors will be preferably located on the axis 22 of the engine.

By the described arrangement, one barrel of each carburetor will feed its air-fuel mixture charge primarily to a pair of cylinders juxtaposed thereto thus maintaining the feature of substantially equal distances from air horn air entrance to intake valve for each cylinder as in the constructions discussed above with respect to Figures 3 and 4.

Figure 5:
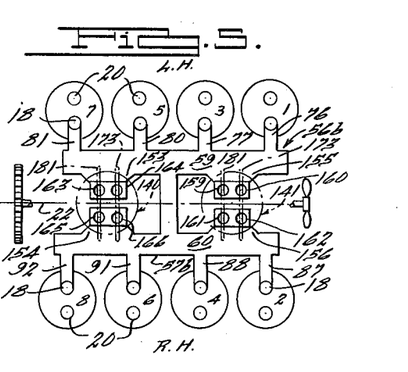
Figure 5 is a schematic view of a further modification illustrating the manifolding of our invention fed by two four-barrel staged downdraft carburetors and utilizing a single balancing tube normal to and interconnecting the runner passages.
Figure 16:
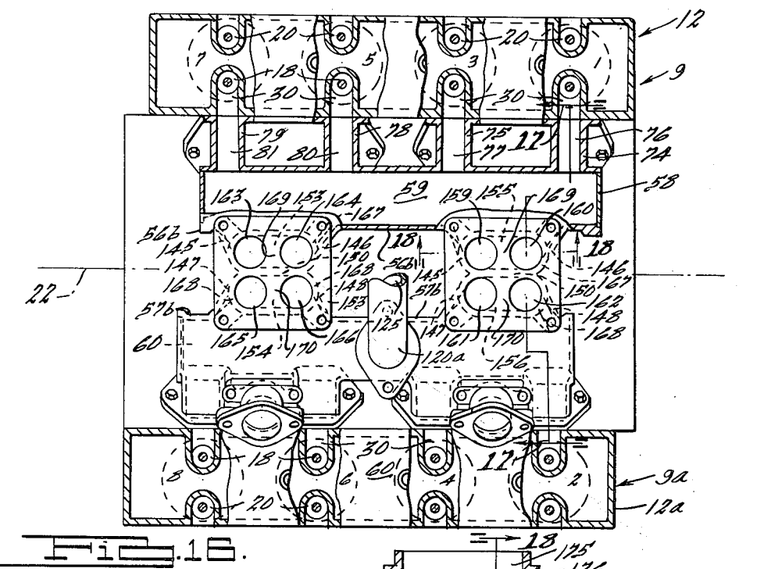
Figure 16 is a plan view partly in section of the intake manifolding of Figure 5 in relation to the cylinder heads of the engine.

As an example of how multiple barrel carburetor means may be employed in our invention as relates to an 8-cylinder V engine, reference is made to Figures 5 and 16 through 18 wherein the construction of Figure 10 has been modified to provide for the use of two four-barrel carburetors 140, 141 located substantially on the longitudinal axis 22 of the engine and on lines intermediate the opposite pairs of end cylinders of the engine. Thus as seen in Figures 5 and 16, the four-barrel carburetor 140 is located on the axis 22 and with its mid point substantially on a line connecting points intermediate the cylinders 5 and 7 of one bank, and the cylinders 6 and 8 of the opposite bank and the second four-barrel carburetor 141 is similarly located in relation to the other pairs of end cylinders 1 and 3 and 2 and 4.

As seen in Figure 16, the opposite runner conduits in this construction are made integral with each other below each carburetor by vertical converging walls 145, 146 which extend laterally of the runner conduit 56ᵇ toward the engine axis 22 to intersect on the axis 22 with similar walls 147 and 148 extending from the opposite runner conduit section 57ᵇ, these walls forming together with a partition or separating wall 150 on the axis 22, and top and bottom walls 151, 152, the pairs of side pockets 153, 154, and 155, 156 opening into the juxtaposed runner passages 59 and 60. Above the pairs of pockets 153, 154 and 155, 156 are horizontal carburetor mounting flanges 157 forming part of vertical conduit or riser sections generally designated by the numeral 158 providing for connection between the four barrels of each of the carburetors 140, 141 and the aforesaid pairs of pockets 153, 154 and 155, 156 respectively. Thus the riser section 158 below the carburetor 141 has four cylindrical air-fuel mixture risers or passages 159, 160, 161, 162 which are counterparts of the carburetor barrels and continuations thereof, and the riser section 158 below the carburetor 140 has similar primary risers or passages 163, 164, 165 and 166. These passages are formed by semi-cylindrical wall portions 167, 168 and the transverse wall portions 169, 170 separating the riser passages.

Figures 17, 18:
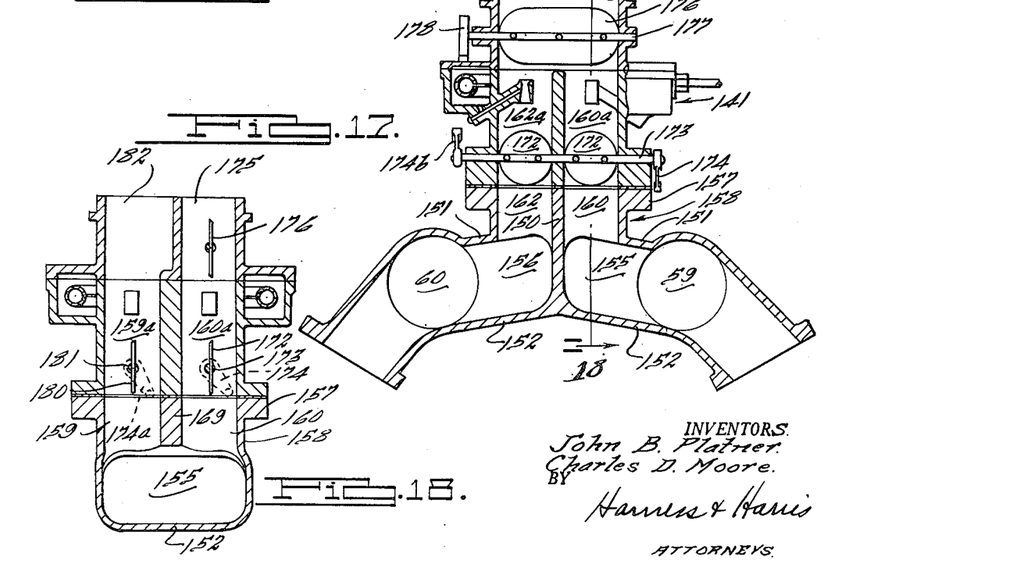
Figure 17 is a cross sectional elevation taken at 17—17 of Figure 16 showing the primary stage barrels of a two-stage, four-barrel downdraft carburetor in position on the intake manifolding of Figure 16.
Figure 18 is a cross sectional elevation taken at 18—18 of Figures 16 or 17 showing one barrel of each of the primary and secondary stages of the carburetor of Figure 17 in relation to the intake ports of the manifold of Figure 16.

As seen in Figures 17 and 18, the two barrels 160ᵃ and 162ᵃ respectively of the carburetor 141 immediately above the riser passages 160 and 162, are provided with throttle blades 172 mounted on a common shaft 173 controlled by a lever 174 located on the left bank side of the carburetor. These two barrels of the carburetor, which are termed the primary barrels, lead to a common air horn 175 controlled by a choke control blade 176 carried by a shaft 177 operable by a thermostat mechanism 178. The other two barrels 159ᵃ and 161ᵃ, the latter not being directly shown immediately above the passages 159 and 161 respectively, are provided with throttle operating blades 180 similar to the blades 172 and operated by a shaft 181 controlled by a lever 174ᵃ.

These two barrels which we term the secondary barrels lead to a common air horn 182 which is preferably not provided with any choke control. As seen, the barrels of the carburetor 140 are arranged above the riser passages 163, 164, 165, and 166 in the same relationship as those of the carburetor 141 are arranged above the passages 159, 160, 161, and 162. Moreover, the primary throttle shafts of the two carburetors are operably connected by suitable linkage including the levers 174ᵇ and the secondary throttle shafts are similarly connected. It will be evident that the primary barrel 160ᵃ and secondary barrel 159ᵃ of carburetor 141 primarily feed the cylinders 1 and 3, and the primary barrel 162ᵃ and secondary barrel 161ᵃ of carburetor 140 are the primary source of air-fuel mixture to the cylinders 2 and 4. In a similar manner one corresponding primary and one corresponding secondary barrel of the carburetor 140 feed the cylinders 5 and 7, and the other of these pairs in the carburetor 140 primarily feed the cylinders 6 and 8.

The barrels are preferably staged by suitable means such that those provided with the choke control, that is to say the primary barrels, open first, in starting the engine and the throttle blades for the other pair of barrels of each carburetor open at some subsequent time when the maximum output of the engine is desired.

Figure 15:
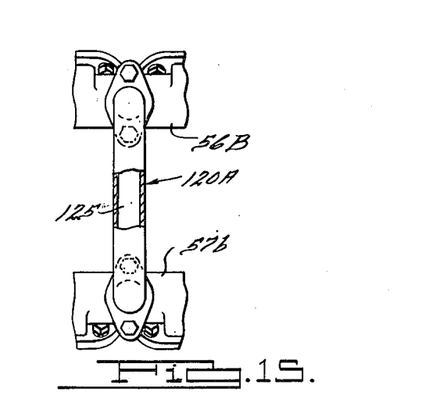
Figure 15 is a plan view of a portion of the intake manifolding of Figure 10 showing the balancing means arranged normal to the runners instead of oblique thereto as in Figure 10.

The balancing member or conduit 120ᵃ utilized in the Figure 16 construction is preferably similar to that of Figure 10 with this difference, that the overhead balance tube is arranged as shown in Figure 15, substantially normal to the runner conduits 56ᵇ and 57ᵇ. This arrangement has the advantage of providing more space between the carburetor bodies and the balance tube in which to make adjustment of the carburetor jets.

Moreover, by having the primary barrels of the two carburetors in the same relationship relative to the transverse axes of the carburetors respectively, the operating levers may be on the same side of the carburetor and the use of motion changing mechanism avoided.

An engine constructed as in Figure 16 having a 7.96 compression ratio and employing a 1½" diameter copper balance tube and 2⅛" diameter cast aluminum runners gave the following power and torque characteristics at the speeds indicated:

| R. P. M. | B. H. P. | Torque (lb. ft.) |
|---|---|---|
| 1,200 | 66.4 | 290.6 |
| 2,000 | 111.0 | 291.5 |
| 3,600 | 227.6 | 332.3 |
| 4,400 | 279.2 | 333.4 |
| 5,200 | 313.6 | 316.7 | and gave the following mixture distribution and consumption characteristics:

| R. P. M. | B.S.F.C. (lb./ B.H.P. Hr.) | Mixture Distribution F/A Ratio By Cylinders | | | | | | | |
|---|---|---|---|---|---|---|---|---|---|
| | | 1 | 3 | 2 | 4 | 5 | 7 | 6 | 8 |
| 1,200 | .438 | .080 | .081 | .081 | .071 | .085 | .072 | .081 | .071 |
| 2,000 | .437 | .080 | .083 | .079 | .078 | .081 | .076 | .083 | .076 |
| 3,600 | .465 | .079 | .083 | .079 | .080 | .080 | .077 | .082 | .077 |
| 4,400 | .457 | .084 | .083 | .081 | .077 | .079 | .078 | .080 | .076 |

In order to appreciate the operational results obtainable with the air-fuel distribution systems described above, a comparison may be made with the results obtained from current production 331 cu. in. V-8 engines of 7.5:1 compression ratio set forth below, which engines are fed by single dual carburetors and have an intake manifold wherein each barrel feeds a pair of inner cylinders of one bank and a pair of outer cylinders of another bank.

| R. P. M. | B. H. P. | Torque (lb. ft.) |
|---|---|---|
| 1,200 | 67.0 | 294.5 |
| 2,000 | 118.5 | 311.0 |
| 3,600 | 181.6 | 265.0 |
| 4,000 | 186.2 | 245.0 |

| R. P. M. | B.S.F.C. (lb./ B. H. P. Hr.) | Mixture Distribution F/A Ratio By Cylinders | | | | | | | |
|---|---|---|---|---|---|---|---|---|---|
| | | 1 | 3 | 2 | 4 | 5 | 7 | 6 | 8 |
| 1,200 | .51 | .081 | .083 | .069 | .077 | .082 | .088 | .079 | .083 |
| 2,000 | .49 | .078 | .080 | .069 | .076 | .081 | .086 | .079 | .084 |
| 3,600 | .50 | .078 | .079 | .072 | .072 | .072 | .076 | .072 | .079 |
| 4,000 | .52 | .076 | .079 | .076 | .073 | .071 | .076 | .072 | .077 |

It will be evident from the foregoing description and the test data that engines utilizing the features of our invention obtain good air-fuel mixture distribution, good specific fuel consumption characteristics, and substantial power and torque outputs.

Our novel balancing means as applied to runner manifolding, makes possible the excellent uniformity of fuel-air mixture distribution obtained by the various cylinders and makes practical the use of runner manifolding in V.engines. In this connection, our avoidance of lean mixtures effectively inhibits preignition in the cylinders, and our avoidance of over-enrichment in some cylinders inhibits fouling of the spark plugs, both factors being of great importance in an engine for developing high outputs.

Moreover, our balancing means favorably affects the dynamic characteristics of the distribution system of our invention, especially in the upper speed ranges and thereby enhances the power and torque outputs obtained. Furthermore, the uniformity of air-fuel mixture distribution obtained, for example, with the engine of Figures 10 and 16 emphasizes the value of the single balancing tube of these constructions.

It will be understood that various modifications and changes may be made in the disclosed structures without departing from the spirit and intent of our invention and all such changes are contemplated. For example, whereas we have shown our invention as applied to an engine having a 90° crank, other cranks for example a flat crank, can be employed if their inherent disadvantages are accepted.

We claim:

1. In an engine having two banks of cylinders arranged angularly about the crankshaft, each cylinder having an inlet valve and an exhaust valve; a plurality of air-fuel mixing means and intake manifolding means for receiving air-fuel mixture from said mixing means, said manifolding means including a pair of air-fuel mixture conducting runner passages extending lengthwise of the engine adjacent the cylinder banks, each operably connecting with the inlet valves of a cylinder bank for feeding air-fuel mixture to the cylinders of that bank, a pair of said mixing means operably connecting with one of said runner passages, another pair of said mixing means operably connecting with the other of said pair of runner passages each of said mixing means being positioned to primarily feed a pair of different cylinders of one bank, and unrestricted transverse passage means operably connecting said runner passages for controlling air-fuel mixture flow, to inhibit over-enrichment of the end cylinders of the banks and increase dynamic charging of the cylinders.

2. In an engine having two banks of cylinders arranged angularly about the crankshaft, each cylinder having an inlet valve and an exhaust valve; a plurality of spaced air-fuel mixing means, and intake manifolding means for receiving air-fuel mixture from said mixing means, said manifolding means comprising a plurality of air-fuel mixture conducting passageways, one extending lengthwise adjacent each cylinder bank and arranged to connect with all the intake ports of the cylinders of its bank and with certain of said spaced mixing means, and a transverse balancing passageway interconnecting said lengthwise passageways intermediate said spaced mixing means.

3. In an engine having two banks of cylinders arranged angularly about the crankshaft, each cylinder having an inlet valve and an exhaust valve; a plurality of air-fuel mixing means and intake manifolding means for receiving air-fuel mixture from said mixing means, said manifolding means including a first air-fuel mixture conducting runner passage extending lengthwise of the engine adjacent one cylinder bank, a second air-fuel mixture conducting runner passage extending lengthwise of the engine adjacent the other cylinder bank, and a transverse air-fuel mixture balancing passage interconnecting said runner passages, each of said runner passages directly connecting with a pair of said mixing means at positions on opposite sides of said balancing passage longitudinally of said runner passages.

4. In an engine having two banks of cylinders arranged angularly about the crankshaft, each cylinder having an inlet valve and an exhaust valve; a plurality of air-fuel mixing means, intake manifolding means for receiving air-fuel mixture from said mixing means, said manifolding means including a first air-fuel mixture conducting runner passage extending lengthwise of the engine adjacent one cylinder bank, a second air-fuel mixture conducting runner passage extending lengthwise of the engine adjacent the other cylinder bank, and a transverse air-fuel mixture balancing passage interconnecting said runner passages, each of said runner passages interconnecting with a pair of mixing means and each such interconnection being at a position intermediate a pair of cylinders which are the end pair of cylinders of the bank to which such runner passage is adjacent and said transverse passage interconnecting said runner passage at positions intermediate the connections made by said mixing means with said runner passages.

5. In an engine having two banks of cylinders arranged angularly about the crankshaft, each cylinder having an inlet valve and an exhaust valve; a plurality of air-fuel mixing means, intake manifolding means for receiving air-fuel mixture from said mixing means, said manifolding means including a first air-fuel mixture conducting runner passage extending lengthwise of the engine adjacent one cylinder bank, a second air-fuel mixture conducting runner passage extending lengthwise of the engine adjacent the other cylinder bank and a pair of unrestricted transverse air-fuel mixture balancing passages interconnecting said runner passages, each of said runner passages connecting with all the cylinders of one bank and each connecting with an air-fuel mixing means adjacent each interconnection thereof with said transverse passages and each of said mixing means being positioned to primarily feed a pair of cylinders.

6. In an engine having two banks of four cylinders each arranged angularly about the crankshaft, each cylinder having an inlet valve and an exhaust valve; a plurality of air-fuel mixing means, intake manifolding means for receiving air-fuel mixture from said mixing means, said manifolding means including first and second air-fuel mixture conducting runner passages extending lengthwise of the engine with one of said passages immediately adjacent each cylinder bank, means connecting each runner passage with the inlet valves of the cylinder bank to which it is immediately adjacent, means providing a single transversely extending air-fuel mixture balancing passage interconnecting said runner passages, and means directly interconnecting each of said runner passages with a pair of fuel mixing means at positions on opposite sides of said transverse passage, each of said mixing means being positioned to primarily feed a pair of cylinders of one bank.

7. In an engine having two banks of four cylinders each arranged angularly about the crankshaft, each cylinder having an inlet valve and an exhaust valve; a plurality of air-fuel mixing means, intake manifolding means for receiving air-fuel mixture from said mixing means, said manifolding means including first and second air-fuel mixture conducting runner passages extending lengthwise of the engine with one of said passages immediately adjacent each cylinder bank, means connecting each runner passage with the inlet valves of the cylinder bank to which it is immediately adjacent, means providing a single transversely extending air-fuel mixture balancing passage of U-shape interconnecting said runner passages, and means interconnecting each of said runner passages with a pair of fuel mixing means at positions on opposite sides of said transverse passage, each of said mixing means being positioned to primarily feed a pair of cylinders of one bank.

8. In an engine having two banks of cylinders arranged angularly about the crankshaft, each cylinder having an inlet valve and an exhaust valve; a plurality of fuel mixing means and intake manifolding means for receiving air-fuel mixture from said mixing means, said manifolding means including a first air-fuel mixture conducting runner passage extending lengthwise of the engine adjacent one cylinder bank, and closed at the opposite ends, a second air-fuel mixture conducting runner passage extending lengthwise of the engine adjacent the other cylinder bank and generally paralleling said first runner passage, said second runner passage being also closed at the opposite ends and being offset lengthwise of the engine with respect to said first runner passage, a transverse air-fuel mixture balancing passage interconnecting said first and second runner passages, and means interconnecting a fuel mixing means with each of said runners at positions intermediate said balancing passage and the ends of said runners.

9. In an engine having two banks of four cylinders each arranged at a V angle to each other, a cylinder head for each bank of cylinders, a single inlet valve and port and a single exhaust valve and port in said cylinder heads over each cylinder, the inlet and exhaust valves for each cylinder being arranged in a plane transversely of the longitudinal axis of the engine and the inlet valves being nearer said axis than the exhaust valves, intake manifolding for delivering air-fuel mixture to said inlet passages including a first elongated runner passage extending longitudinally of the engine adjacent one bank of cylinders, a second elongated runner passage extending longitudinally of the engine adjacent the other bank of cylinders, relatively short transverse passages interconnecting the inlet ports of each bank of cylinders with the runner passage adjacent its bank, a crossover balancing passage interconnecting said first and second runner passages at positions intermediate the middle pair of cylinders of each bank, and a plurality of air-fuel mixing means for delivering air-fuel mixture to said runner passages, there being one of said mixing means positioned intermediate each pair of end cylinders of each bank and in justaposition to the runner passage adjacent the cylinder bank having the said pair of end cylinders and said mixing means connecting with said juxtaposed passage.

10. An engine as claimed in claim 9 wherein each said mixing means comprises a pair of barrels of a multi-barrel carburetor.

11. In an engine having two banks of four cylinders each arranged at a V angle to each other, a cylinder head for each bank of cylinders, a single inlet valve and port and a single exhaust valve and port in said cylinder heads over each cylinder, the inlet and exhaust valves for each cylinder being arranged in a plane transversely of the longitudinal axis of the engine and the inlet valves being nearer said axis than the exhaust valves, intake manifolding for delivering air-fuel mixture to said inlet passages including a first elongated runner passage extending longitudinally of the engine adjacent one bank of cylinders, a second elongated runner passage extending longitudinally of the engine adjacent the other bank of cylinders, relatively short transverse passages interconnecting the inlet ports of each bank of cylinders with the runner passage adjacent its bank, a pair of unrestricted crossover balancing passages interconnecting said first and second runner passages, each of said crossover passages extending from a position intermediate a pair of end cylinders of one bank to a position intermediate a pair of directly opposite end cylinders of the opposite bank, and a plurality of air-fuel mixing means for delivering air-fuel mixture to said runner passages, there being one of said mixing means positioned intermediate each pair of end cylinders of each bank of cylinders and in juxtaposition to the runner passage adjacent the cylinder bank having the said pair of end cylinders and said mixing means connecting with said juxtaposed passage and primarily feeding said pair of end cylinders.

12. In an engine having two banks of four cylinders each arranged in a cylinder block at a V angle to each other, a cylinder head on each bank of cylinders, a single inlet valve and port and a single exhaust valve and port in said cylinder heads over each cylinder, the inlet and exhaust valves for each cylinder being arranged in a plane transversely to the longitudinal axis of the engine and the inlet valves being nearer said axis than the exhaust valves, intake manifolding for delivering air-fuel mixture to said inlet passages including a first elongated runner passage extending longitudinally of the engine adjacent one bank of cylinders, a second elongated runner passage extending longitudinally of the engine adjacent the other bank of cylinders, relatively short transverse passages connecting the inlet passages of each bank with the runner passage adjacent its bank, a crossover passage interconnecting said first and second runner passages at positions intermediate the middle pair of cylinders of each bank, a plurality of air-fuel mixing means for delivering air-fuel mixture to said runners, there being one of said mixing means adjacent each pair of end cylinders of each bank and interconnecting with the runner passage of that bank at a position intermediate said end cylinders, each of said mixing means at the same end of the engine comprising a two-barrel mixing means and together comprising a single four-barrel carburetor, throttle means for controlling opening of said barrels to deliver air-fuel mixture to said runner passages and operable to effect an operation whereby one barrel for each runner passage of each carburetor will be open to deliver air-fuel mixture to its runner passage before the other barrel of said carburetor feeding the same runner passage.

13. In an engine having two banks of four cylinders each arranged in a V about the crankshaft, each cylinder having an inlet valve and an exhaust valve; a plurality of air-fuel mixing means, intake manifolding means for receiving air-fuel mixture from said mixing means, said manifolding means including a pair of substantially coplanar runner passages extending lengthwise of the engine one adjacent each bank thereof, lateral passage means connecting each runner passage with each inlet valve of its adjacent bank, means providing an overhead balancing passage interconnecting said runner passages intermediate the middle cylinders of each bank, and riser means interconnecting the fuel mixing means with said runner passages intermediate the end cylinders of the banks.

14. In an engine having two banks of four cylinders each arranged in a V about the crankshaft, each cylinder having an inlet port and valve and an exhaust port and valve; a plurality of air-fuel mixing means for feeding said cylinders, said mixing means each having an air entrance intake manifolding means including a pair of substantially coplanar runner passages extending lengthwise of the engine, one adjacent each bank thereof, lateral passage means connecting each runner passage with each inlet port of one bank, air-fuel mixture balancing passage means interconnecting said runner passages, a pair of said fuel mixing means connecting with each of said runner passages and each of said mixing means being arranged to primarily feed a pair of adjacent cylinders connecting with the runner passage to which it is connected and being located intermediate this pair of cylinders and adjacent this runner, and the distance from the air entrance of each fuel mixing means to the intake valves of the cylinder it primarily feeds being approximately $$L = \frac{72C}{N}$$

where L is the passage length in inches between said air entrance and inlet valve, N is the engine speed in revolutions per minute at which the torque of the engine is to be substantially at a peak, and C is the velocity of sound in feet per second in the manifold passages.

15. In an engine having two banks of cylinders arranged angularly about the crankshaft, each cylinder having an inlet port and valve and an exhaust port and valve, intake manifolding means for receiving air-fuel mixture from said mixing means, said manifolding means including a pair of substantially coplanar substantially cylindrical runner passages extending lengthwise of the engine, one adjacent each bank thereof, lateral passage means connecting each runner passage with each inlet port of its adjacent cylinder bank, a plurality of air-fuel mixing means connecting with each runner for feeding the cylinders in the bank adjacent thereto and substantially cylindrical balance passage means interconnecting said runner passages, the cross sectional area of said passage means being at least about 50% of the cross sectional area of a runner passage and each of said mixing means being positioned to primarily feed a pair of cylinders of one bank.

16. In an engine having two banks of four cylinders each arranged in a V about the crankshaft, a cylinder head for each bank having a hemispherical combustion chamber for each cylinder, the cylinders of one bank being numbered 1, 3, 5, and 7, and those of the other bank being numbered 2, 4, 6, 8, a single inlet valve and port and a single exhaust valve and port in said cylinder heads over each cylinder and on a great circle of said chambers, the inlet valves of each bank being in a common plane, manifolding means including a pair of runner passages extending lengthwise of the engine, one adjacent each bank of cylinders, lateral passages interconnecting each runner with the intake ports of each of the cylinders of the bank to which it is adjacent, a single balancing passage interconnecting said runner passages intermediate the cylinders 3 and 5 and 4 and 6 and a plurality of fuel mixing means respectively operatively arranged intermediate the cylinders of the pairs 1, 3; 5, 7; 2, 4, and 6, 8 and arranged to primarily deliver their air-fuel charges to said cylinders by way of the runner passages adjacent to said cylinders.

17. An engine as claimed in claim 7 wherein said balancing passage extends substantially normal to said runner passages and wherein said fuel mixing means intermediate the cylinder pairs 1, 3 and 2, 4 are barrels of a common carburetor and those intermediate the cylinder pairs 3, 5 and 6, 8 are barrels of a common carburetor.

18. In an engine having two banks of four cylinders each arranged angularly about the crankshaft, each cylinder having an inlet port and valve and an exhaust port and valve, a plurality of air-fuel mixing means for feeding said cylinders, each mixing means having an air entrance intake manifolding intermediate said cylinder banks and including a pair of elongated substantially coplanar runner passages, one each extending lengthwise of the engine in juxtaposition to a cylinder bank, branch passages connecting said runner passages respectively with each inlet valve of its juxtaposed bank of cylinders, said branch passages being substantially of the same length, and a balancing passage having a cross sectional area at least about 50% of the cross sectional area of a runner passage, interconnecting said runner passages and having a major portion of its length in a different plane from said runner passages, there being a pair of said mixing means positioned substantially on the axis of each runner passage and on opposite sides of said balancing passage with each mixing means of said pairs intermediate a different pair of cylinders, and the distance from the air entrance of each mixing means to the inlet valves of the cylinders it is intermediate being substantially equal.

19. In an engine having two banks of four cylinders each arranged angularly about the crankshaft, each cylinder having an inlet port and valve and an exhaust port and valve, a plurality of air-fuel mixing means for feeding said cylinders, intake manifolding intermediate said cylinder banks and including a pair of elongated substantially coplanar runner passages, one each extending lengthwise of the engine in juxtaposition to a cylinder bank, branch passages connecting said runners with each inlet valve of its juxtaposed bank of cylinders, a balancing passage interconnecting said runner passages intermediate the middle cylinders of each bank, said balancing passage having a major portion of its length in a different plane from the plane of said runner passages and opposite lateral extensions of said runner passages intermediate the end cylinders of said banks and riser passage means interconnecting each of said lateral extensions with a different mixing means.

20. In an engine having two banks of four cylinders each arranged in a V about the crankshaft, each cylinder having an inlet port and valve and an exhaust port and valve; a plurality of air-fuel mixing means for feeding said cylinders, said mixing means each having an air entrance, intake manifolding means extending lengthwise of the engine and having lateral passages connecting with the inlet ports of the cylinders, each of said fuel mixing means being arranged to primarily feed a pair of cylinders, the distance from the air entrance of each fuel mixing means to the intake valves of the cylinder it primarily feeds being approximately $$L = \frac{72C}{N}$$

where L is the passage length in inches between said air entrance and inlet valve, N is the engine speed in revolutions per minute at which the output of the engine is to be substantially at a peak, and C is the velocity of sound in feet per second in the manifold passages.

21. In an internal combustion engine having a plurality of cylinders each including a combustion chamber provided with a single inlet opening and valve, a single exhaust opening and valve and spark ignition means; in combination therewith, an intake manifold for feeding air fuel mixture to said chambers, said manifold comprising a plurality of tuned air conducting intake passage means each having an air entrance associated with a source of air and having its outlet at an inlet valve, there being one of said passage means extending from the said inlet valve of each chamber, and said manifold having fuel supply means connecting each of said air intake passage means at a position remote from the said inlet valve from which it extends for supplying fuel to said air intake passage means for mixture with the air therein prior to admission thereof to said chambers and the length of each of said tuned air intake passage means in inches being approximately $$\frac{72C}{N}$$

where N is the engine speed in revolutions per minute at which the output of the engine is to be substantially at a peak, and C is the velocity of sound in feet per second in said passage means.

22. In an internal combustion engine having a plurality of cylinders arranged in a pair of banks about the crankshaft thereof, each cylinder including a combustion chamber provided with a single inlet opening and valve, a single exhaust opening and valve and spark ignition means; in combination therewith an intake manifold for feeding air fuel mixture to said chambers, said manifold comprising a pair of passageways one extending lengthwise of the engine adjacent each cylinder bank, the said longitudinal passageways having lateral branches, those of one longitudinal passageway connecting with the inlet valves of one bank of cylinders and those of the other longitudinal passageway connecting with the intake valves of the other bank of cylinders, a plurality of air fuel mixing means each positioned to primarily feed a pair of different cylinders of the said banks of cylinders, each of said air fuel mixing means having an air entrance and the distance from the air entrance of each air fuel mixing means to the cylinders it primarily feeds in inches being approximately $$\frac{72C}{N}$$

where N is the engine speed in revolutions per minute at which the output of the engine is to substantially peak and C is the velocity of sound in feet per second in said passage means.

References Cited in the file of this patent

UNITED STATES PATENTS

| | | |
|---|---|---|
| 1,307,896 | Colardeau | June 24, 1919 |
| 1,312,555 | McCain | Aug. 12, 1919 |
| 1,365,564 | Strickland | Jan. 11, 1921 |
| 1,488,285 | Rhoads | Mar. 25, 1924 |
| 1,763,726 | Timian | June 17, 1930 |
| 1,802,848 | Summers | Apr. 28, 1931 |
| 1,834,473 | Ricardo | Dec. 1, 1931 |
| 1,862,723 | Summers | June 14, 1932 |
| 1,905,258 | Williams | Apr. 25, 1933 |
| 1,936,694 | Summers et al. | Nov. 28, 1933 |
| 1,977,200 | Osterberg | Oct. 16, 1934 |
| 2,046,797 | Swan | July 7, 1936 |
| 2,104,178 | Anderson | Jan. 4, 1938 |
| 2,160,922 | Sullivan | June 6, 1939 |
| 2,192,067 | Betry | Feb. 27, 1940 |
| 2,315,183 | Bicknell et al. | Mar. 30, 1943 |
| 2,573,095 | Ellis | Oct. 30, 1951 |

FOREIGN PATENTS

| | | |
|---|---|---|
| 515,410 | Great Britain | Feb. 28, 1938 |
| 518,518 | Great Britain | Feb. 29, 1940 |